United States Patent [19]

Yeh

[11] Patent Number: 5,462,669

[45] Date of Patent: Oct. 31, 1995

[54] METHOD FOR DISSOLVED AIR FLOATATION AND SIMILAR GAS-LIQUID CONTACTING OPERATIONS

[76] Inventor: George C. Yeh, 2x Smedley Dr., Newtown Square, Pa. 19073

[21] Appl. No.: 281,507

[22] Filed: Jul. 27, 1994

Related U.S. Application Data

[62] Division of Ser. No. 36,665, Mar. 24, 1993, Pat. No. 5,382,358.

[51] Int. Cl.$^6$ ..................................................... C02F 1/24
[52] U.S. Cl. ......................... 210/703; 210/712; 210/713; 210/805; 210/221.2; 210/194; 210/197; 210/788
[58] Field of Search ................................. 210/703, 704, 210/706, 707, 713, 712, 776, 805, 221.1, 221.2, 194, 197, 788, 789

[56] References Cited

U.S. PATENT DOCUMENTS

| | | |
|---|---|---|
| 2,191,190 | 2/1940 | De Guire . |
| 3,175,687 | 3/1965 | Jones . |
| 3,557,956 | 1/1971 | Brown . |
| 4,208,276 | 6/1980 | Bahr . |
| 4,214,982 | 7/1980 | Pfalzer . |
| 4,622,132 | 11/1986 | Chupka . |
| 4,681,682 | 7/1987 | White et al. . |
| 4,816,165 | 3/1989 | Carroll . |
| 4,952,308 | 8/1990 | Chamberlain . |
| 5,098,572 | 3/1992 | Faup . |
| 5,151,177 | 9/1992 | Roshanravan . |
| 5,160,610 | 11/1992 | O'Reilly . |
| 5,242,585 | 9/1993 | Korfta . |
| 5,382,358 | 1/1995 | Yeh . |

FOREIGN PATENT DOCUMENTS

| | | |
|---|---|---|
| 52-25461 | 2/1977 | Japan . |
| 25461 | 2/1977 | Japan . |
| 136360 | 11/1978 | Japan . |
| 296482 | 12/1991 | Japan . |
| 2106490 | 4/1983 | United Kingdom . |

OTHER PUBLICATIONS

Hahn, Hermann H., "Wastewater Treatment", *The Scientific Basis of Flotation*, Martinus Nijhoff Publishers, The Hauge (1984), pp. 379'415.
Bal, A. S. et al., "Dissolved Air Floatation Technique for Watr and Wastewater Treatment", *Chemical Age of Indig*, vol. 36, No. 2, (Feb. 1985) pp. 219–229.
Edzwald, J. K. et al., "Flocculation and Air Requirements for Dissolved Air Flotation", Research and Technology, Journal AWWA (Mar. 1992), pp. 92–100.
Tenco Hydro, Inc. brochure "Clari Float", Bulletin No. CF–2, Brookfield, Ill. (Apr. 1987), 4 pages.
Pollution Control Enginerring, Inc. brochure "Improve Your Profits with More Efficient Wastewater Treatment System", Santa Ana, Calif. (no date), 1 page.
Thames Technologies Inc. brochre "Dissolved Air Floatation Systems", Grapevine, Tex. (no date) 4 pages.
Purac Engineering, Inc. brochure "Dissolved Air Flotation Systems", Wilmington, Del. (no date), 12 pages.
Tenco Hydro, Inc. Brochure (Clari–Float) Bulletin No. CF–2.

*Primary Examiner*—Thomas M. Lithgow
*Attorney, Agent, or Firm*—Howson and Howson

[57] ABSTRACT

A method and apparatus for dissolved air floatation (DAF) and for gas-liquid contacting operations by dissolved air floatation. A number of involute flow channels in a container have inlets and outlets positioned at either end for involutional or evolutional flow of a mixture of liquid and dissolved gas. Liquid turbulence and mixing are prevented in order to achieve a near plug-flow condition for maximum separation. Other uses of the method and apparatus include hydraulic flocculation of suspended matters in a liquid, separation of non-floatable suspended matters, oxidation of dissolved organic matter, activated sludge processes, purification of water using a biocide, separation by absorption of gases, stripping by desorption of dissolved gases, and gas-liquid reactions.

22 Claims, 4 Drawing Sheets

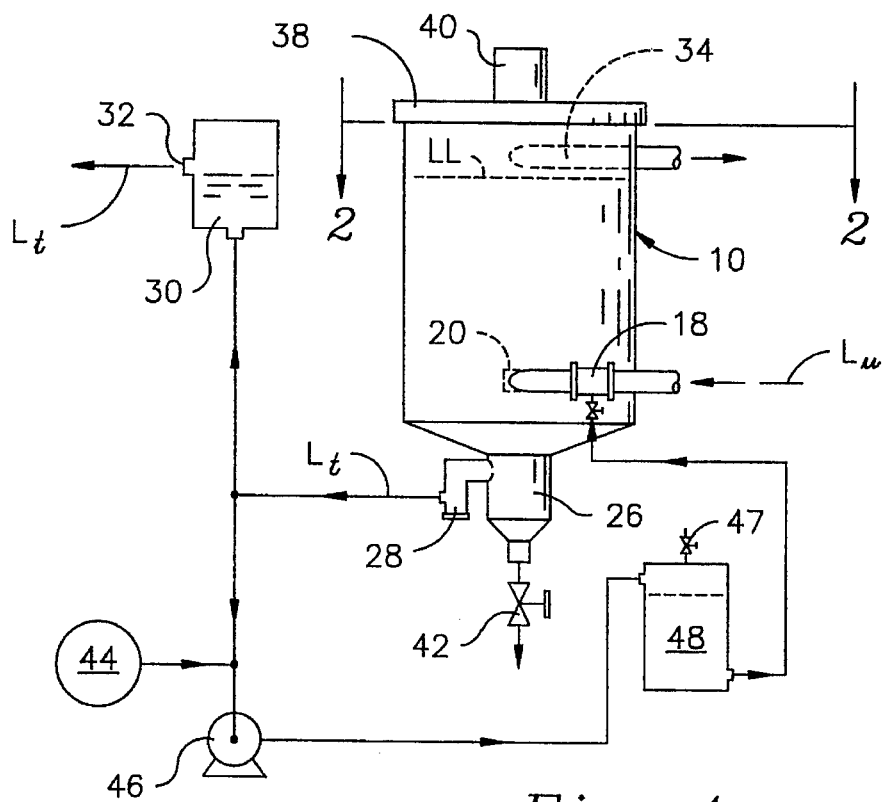
Fig. 1
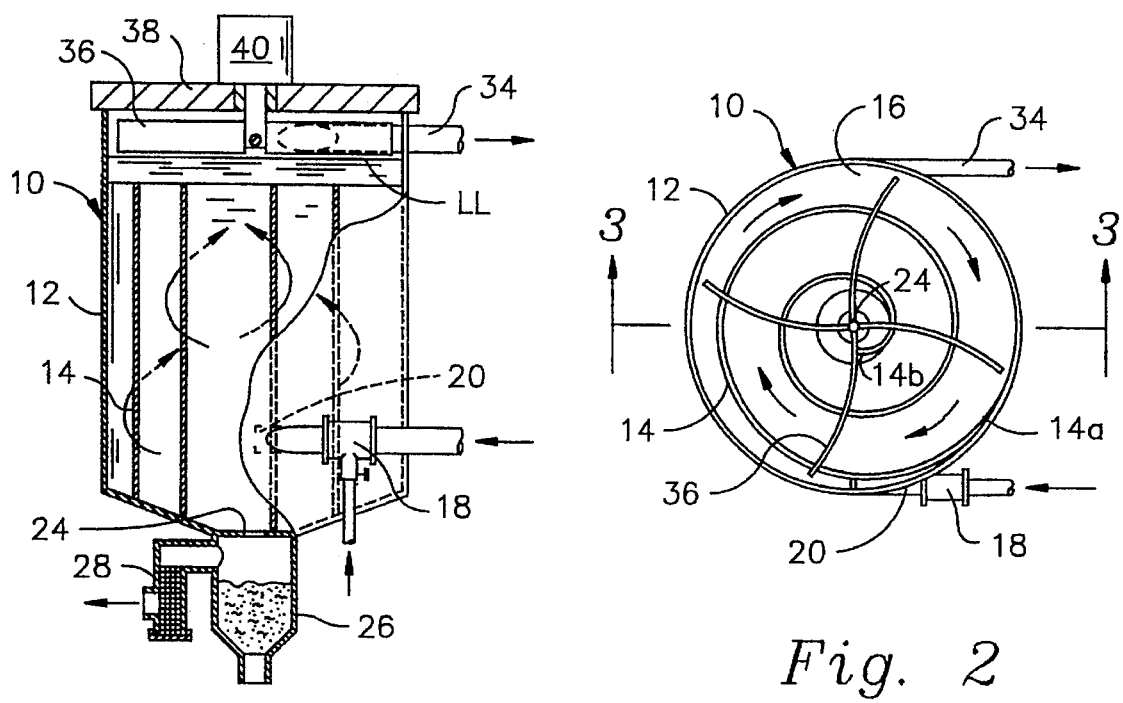
Fig. 3
Fig. 2

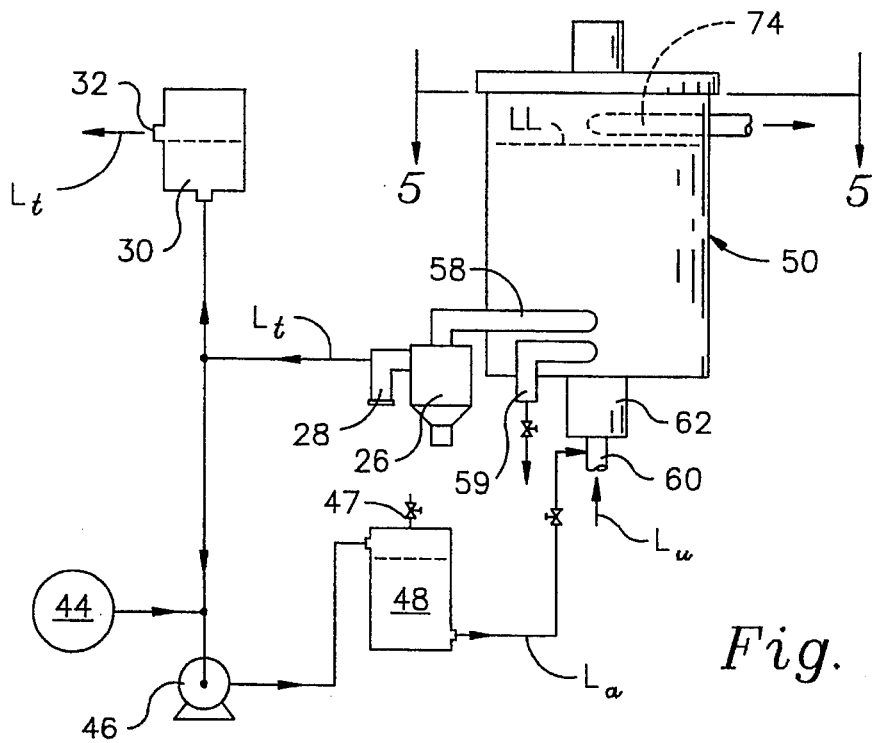
*Fig. 4*
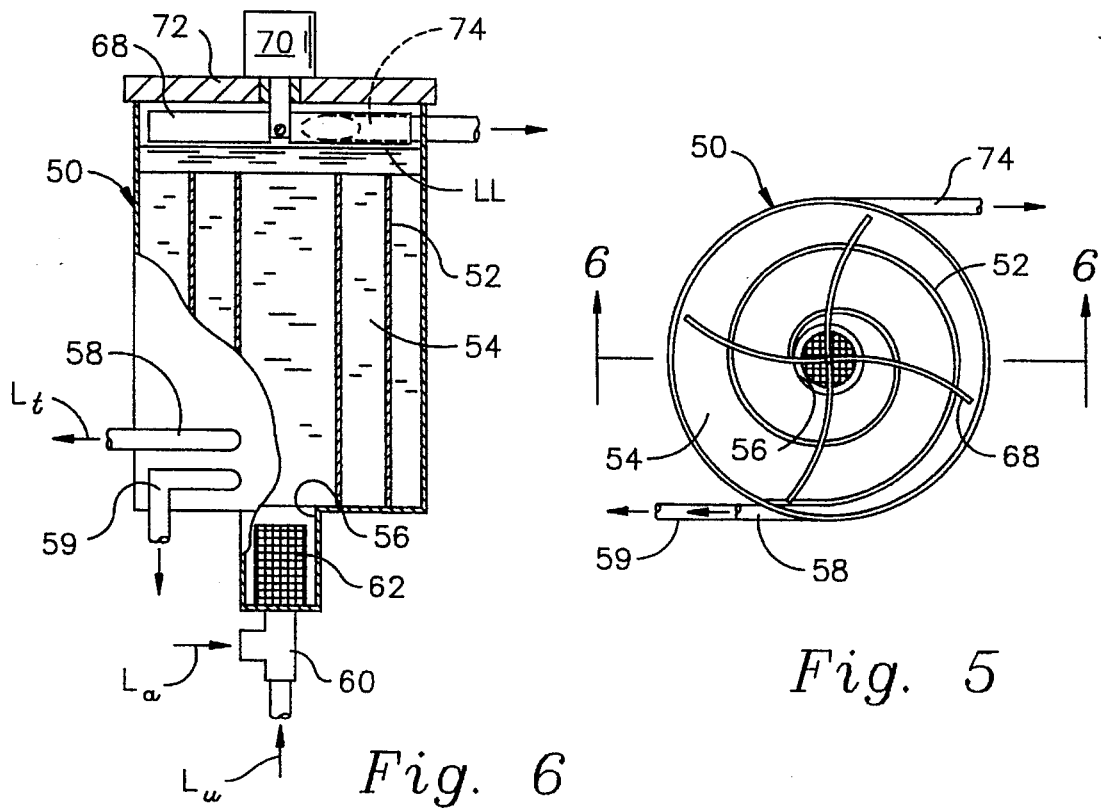
*Fig. 6*
*Fig. 5*

METHOD FOR DISSOLVED AIR FLOATATION AND SIMILAR GAS-LIQUID CONTACTING OPERATIONS

This is a divisional of application Ser. No. 08/036,665 filed on Mar. 24 1993 now U.S. Pat. No. 5,382,358.

BACKGROUND OF THE INVENTION

1. Field of the Invention

This invention relates generally to dissolved air floatation (DAF) systems, and more particularly to a new improved method for DAF systems and other gas-liquid contacting systems for separating and reacting liquids and contacting gases.

2. Description of the Prior Art

Many industrial activities are sources of gases, liquids, and gas and liquid wastes containing condensable organic vapors and emulsified or nonemulsified suspended matter such as oils, fats, greases, metals, organic and inorganic solids which must be separated or treated before they can be used in any subsequent process or before they are discharged into the environment. These activities include petroleum and vegetable oil refining, steel making, food and beverage processing, metal working, chemical and paint manufacturing, pulp, paper and textile production, aircraft maintenance, coke-oven gas treatment, and water conditioning and treatment. The concentration of suspended matter and other constituents varies widely depending on the source and process conditions.

Treatment of the above liquids and liquid wastes is usually carried out in at least two stages. First, easily settled solids are separated from the liquid medium by gravity and floating oily constituents are skimmed off. Then stable emulsified liquids are broken down for separating the remaining oily constituents from water. Any remaining dissolved matter may be removed, if necessary, by one or more additional stages including extraction, adsorption, absorption, distillation, crystallization, membrane separation, and chemical separation.

Currently, three methods widely used for separating suspended matter from a liquid are gravity separation or sedimentation for heavier-than-liquid solids, filtration for small particles, and air floatation for floatable suspended matter. Of these, air floatation is the most versatile and widely practiced in the industry. Air may be bubbled through the liquid causing suspended matter to float to the surface where it can be skimmed off. However, very small suspended matter is not effectively separated by this method. A more effective method is by dissolved air floatation (DAF). Air at high pressure is dissolved in the liquid to be treated and introduced into a floatation tank at a lower pressure. Microbubbles of air 10 to 40 micrometers in size are released and rise gently through the liquid lifting floatable suspended matter to the surface.

A conventional DAF system feeds both the raw, untreated liquid and a liquid with dissolved air into the floatation tank through separate inlets located near the bottom. Treated liquid, still containing suspended matter but in reduced concentrations is discharged near the bottom of the tank while floated suspended matter is skimmed off and removed at the top. Since floatation of the suspended matter by rising air bubbles takes place vertically, there is a vertical concentration gradient of the suspended matter in the liquid in the floatation zone. Due to the buoyant force of the rising air bubbles, the untreated liquid in contact with the bubbles moves upward while the treated liquid moves downward. The vertical countercurrent flow of the two liquids produces turbulence and mixing of the two liquids and thereby reduces separation efficiency.

The turbulence and mixing may be somewhat minimized by reducing the inflow rate and by adding a baffle to direct the floc-bubble agglomerates toward the surface. The baffle, generally cylindrical for a cylindrical tank and flat for a rectangular tank, is placed approximately 60° from the horizontal plane to reduce the velocity and the coalescence of the rising air bubbles. The liquid rising under the floated matter must turn at the top of the baffle approximately 180° and flow downward to a discharge at the bottom of the tank. The turbulence created by the rising air bubbles and the floated matter flowing over the baffle causes mixing near the liquid surface. Consequently, the baffles are relatively ineffective. Baffles also drastically reduce the available surface area of the tank for floatation, and require a relatively tall tank to allow sufficient space above the baffles for floated matter to flow over the surface. Unpreventable turbulence in the contacting zone inside a baffle can also cause poor attachment of air bubbles to particles of the suspended matter and break-up of floc-bubble agglomerates.

It is generally impractical to separate very dilute concentrations (less than 10 ppm) or very small (less than 10 microns) suspended particles from a liquid medium by conventional DAF systems. Chemicals, such as polyvalent electrolytes and long-chain polymers, are used to coagulate and flocculate small particles to form larger aggregates which can be more readily contacted and attached by the air bubbles. The larger aggregates, being more buoyant and less likely to break up in turbulence, makes floatation easier and separation efficiencies higher. Efficiencies may range from 10 percent to 40 percent without the chemicals, and between 40 percent and 90 percent with chemicals. Paradoxically, the added chemicals may create more problems than they solve. They not only increase the cost of separation but also the process time. Coagulation can occur very rapidly in a fast-mixing tank, but flocculation takes time, normally about 20 to 30 minutes, and requires a slow-mixing tank. Only a very small fraction of the chemicals dissolved into the liquid are actually removed with the floated matter. The remaining chemicals may have to be removed later if their concentration is unacceptable for recycling or release to the environment.

A more recent DAF system for minimizing mixing between the untreated liquid and treated liquids divides the floatation tank into several communicating compartments and directs the liquid serially through each compartment. Separation is somewhat improved for large tanks, but only marginally for small tanks. For a given flow rate, mixing will be more pronounced with a limited number of small compartments.

Another system utilizes a long floatation tank with a liquid inlet at one end and a liquid outlet at the other end. Back-mixing of liquid may be reduced, but there are few DAF sites having sufficient space to accommodate such a long tank.

One of the most popular DAF systems recycles treated liquid back to the floatation tank, but there is a trade-off. Throughput capacity is reduced, there is more back-mixing of the liquid being treated, and operating costs are higher. To compensate for these deficiencies, the system is often combined with other technologies, filtration being a frequent choice especially for producing potable drinking water. However, the combination of dissolved air floatation with such technologies invariably increases the complexity and the cost of the system.

Separation and removal of large, heavy solids which tend to settle at the bottom of a tank is another problem area. One solution uses a slow-speed agitator combined with a separate outlet for solids at the bottom of the tank, but undesirable liquid turbulence and mixing will occur.

From all of the above, it is apparent that turbulence and back-mixing of liquid inside conventional DAF tanks is a pervasive and continuing problem affecting separation efficiency. Baffles and low flow rates reduce the turbulence and back-mixing, but at the expense of throughput capacity. Chemicals facilitate the separation of liquids, but they also increase process time and costs, and manifest many undesirable side effects. Recycling treated liquid per se may improve separation efficiency but it also increases costs and back-mixing. Methods and apparatus for removing the floated matter and/or settled solids also contribute to the turbulence and back-mixing. None of these are capable of preventing turbulence and back-mixing of the liquid being treated without sacrificing throughput capacity. High separation efficiencies have been realized only with chemicals and time-consuming flocculation. Simultaneous removal of floated matter and settled solids may be achieved but with the undesirable effects of liquid turbulences.

SUMMARY OF THE INVENTION

It is therefore an object of the present invention to provide a novel and improved DAF method which obtains more complete and faster separation of suspended matter from a liquid medium without turbulence and back-mixing.

Another object is to provide an improved DAF method which can separate dilute concentrations of minute suspended matter from a liquid medium.

A further object is to provide an improved DAF method which will facilitate simultaneous removal of floated sludge and settled solids with substantially no loss in separation efficiency.

A further object is to provide an improved DAF method which will separate a stable emulsified liquid from a liquid medium with the addition of little or no chemicals, and which will promote flocculation of suspended matter contained in the liquid medium.

Still another object of the invention is to provide an improved DAF method suitable for gas-liquid contacting processes.

Briefly, these and other objects are achieved in a DAF system with an upright cylindrical tank having at least one vertical partition curved to form an involute channel. A mixture of untreated liquid and liquid saturated with dissolved air under pressure are continuously introduced at one end of the channel near the bottom of the tank, flows along an involutional or evolutional path under plug-flow flow conditions, and discharges at the other end near the bottom. Microbubbles of the air released from the liquid mixture rise through the liquid mixture to produce a buoyancy force which carries any contacted particles of suspended matter to the surface in a cyclohelical path. Centrifugal force and gravitation gradually settle large or heavy solids to the bottom, which are discharged separately from the liquid. The suspended matter at the surface is continuously drawn off.

As the mixture of liquids flows through the channel, involutionally toward the inner end with increasing angular and radial velocities or evolutionally toward the outer end with decreasing angular and radial velocities, it will gradually clarify from the bottom up as suspended matter increases toward the liquid surface. Under steady state conditions a concentration gradient is established depthwise and lengthwise along the flow path. The centrifugal force acting on the liquid also produces a radially inward hydraulic pressure which aids in flocculation of particles without turbulence.

There is no counter-current flow or back-mixing of liquid inside the channel, since the liquid enters at one end and leaves at the other end. Absence of liquid turbulences in the DAF tank is necessary for stable attachment of particles to the air bubbles and for separation of very dilute concentrations of particles. The entire internal surface area of the floatation tank is available for floatation. The design and scale-up of the floatation tank is simple and straight forward and according to design principles of plug-flow reactors.

BRIEF DESCRIPTION OF THE DRAWINGS

For a better understanding of the nature and the objects of the invention, reference will be made to the following detail description taken in conjunction with the accompanying drawings wherein:

FIG. 1 is a schematic block diagram of one preferred embodiment of a DAF system according to the invention utilizing a single channel involutional flow tank;

FIG. 2 represents a cross-sectional plan view of the tank of FIG. 1 taken along the line 2—2;

FIG. 3 represents a cross sectional elevation view of the tank of FIG. 1 taken along the line 3—3 of FIG. 2;

FIG. 4 is a schematic block diagram of another embodiment of a DAF system according to the invention utilizing a single channel evolutional flow tank;

FIG. 5 represents a cross-sectional plan view of the tank of FIG. 4 taken along the line 5—5;

FIG. 6 represents a cross sectional elevation view of the tank of FIG. 4 taken along the line 6—6 of FIG. 5;

DESCRIPTION OF THE PREFERRED EMBODIMENTS

Figure 7:
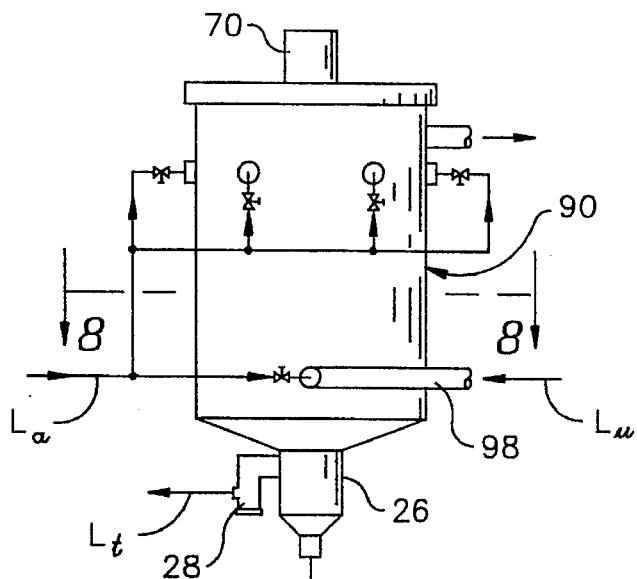
FIG. 7 is a side elevation view of still another embodiment according to the invention of a single channel involutional flow tank having plural dissolved air diffusers.
Figure 10:
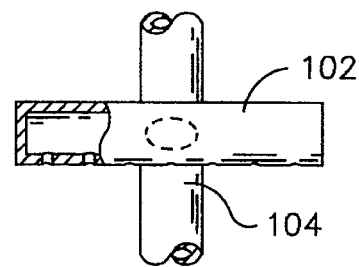
FIG. 10 is an enlarged plan view, partially in cross section, of a dissolved air diffuser illustrated in FIG. 7.
Figure 11:
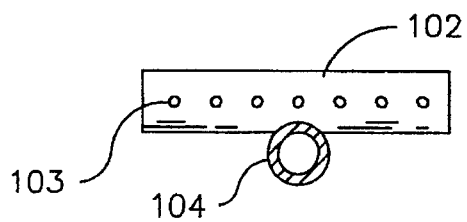
FIG. 11 is an enlarged elevation view, partially in cross section, of the dissolved air diffuser of FIG. 10.
Figure 9:
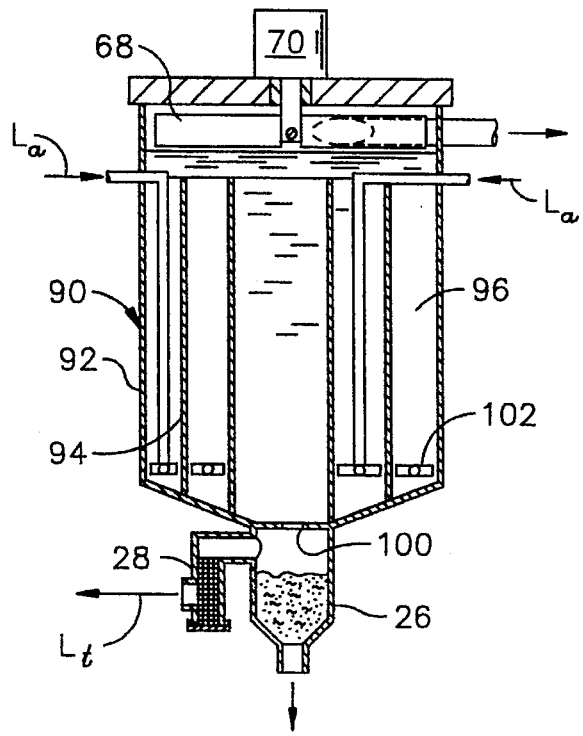
FIG. 9 is a cross sectional side elevation view of the tank of FIG. 7 taken along the line 9—9 of FIG. 8.
Figure 8:
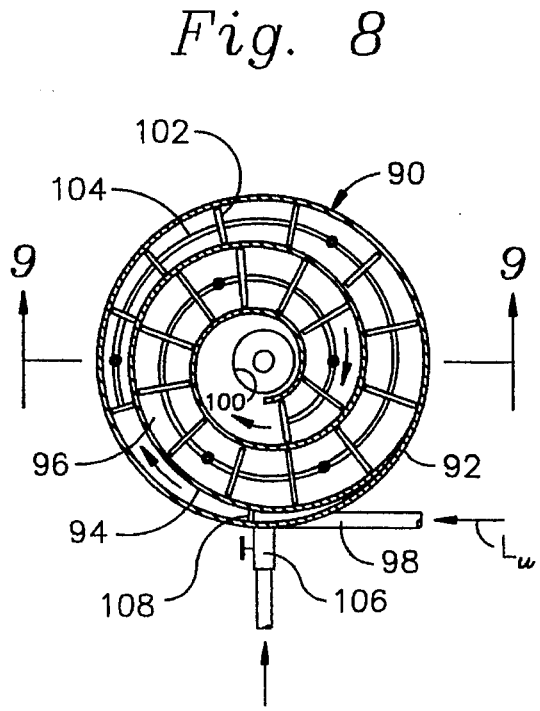
FIG. 8 represents a cross sectional plan view of the tank of FIG. 7 taken along the line 8—8.

Turbulence and back-mixing of liquid flowing through a dissolved air floatation (DAF) tank according to the invention can be prevented by passing the liquid to be treated through an involutional or evolutional flow channel. With a liquid inlet at one end and a liquid outlet at the other end of the channel a plug-flow with maximum separation of any suspended matter in the liquid occurs. Under plug-flow conditions, the residence time of the liquid is inversely proportional to its average linear velocity, equal also to the ratio of the channel length to the velocity, and equal to the ratio of the channel volume to the liquid flow rate. This condition can be maintained over the entire length of the flow channel for a wide range of flow rates, since the radial and tangential components of the flow pressure in the liquid, according to the conservation of angular momentum, are approximately in balance at all the times.

DAF tanks are designed to treat liquids with a specific inflow rate in mind. The liquid flow rate and residence time required for separation will dictate the dimensions (length, width, and height) of the flow channel. For maximum efficiency, the residence time of the liquid should be approximately equal to or slightly larger than the average residence time of air bubbles released from the liquid (ideally smaller than 130 microns) to ensure that all of the liquid has been contacted by the air bubbles and that all the air bubbles will have reached the surface of liquid by the time the liquid being treated has reached the outlet of the flow channel. In this way no part of the air supplied is wasted.

The average terminal velocity $V_t$ and the average residence time t of air bubbles rising, without coalescence through a quiet liquid of a given depth z, can be fluid-dynamically estimated as follows:

$$V_t = dz/dt, \text{ or} \tag{1}$$

$$dt = dz/V_t. \tag{2}$$

Therefore
row $$t = \int_o^t dt = \int_o^z dz/V_t. \tag{3}$$

The initial bubble volume is $$v_o = v_z(P_o/P_z) \tag{4}$$

where $V_z$=volume at depth z, $P_o$=pressure at the bottom, and $P_z$=pressure at depth z.

This pressure can be related to the density of liquid $\rho_l$ as follows:

$$P_o = P_a + (g/g_c)\rho_l Z, \text{ and} \tag{5}$$

$$P_z = P_a + (g/g_c)\rho_l(Z-z) \tag{6}$$

The volume v and diameter dp of the bubble, $\rho_a$= atmospheric pressure, and Z=total height of the liquid are therefore related as follows:

$$v = (\pi/6)dp^3 = v_o P_o/P_a + (g/g_c)\rho_l(Z-z), \text{ and} \tag{7}$$

$$dp = dp_o\{[P_a + (g/g_c)\rho_l Z]/[P_a(g/g_c)\rho_l(Z-z)]\}^{1/3} \tag{8}$$

By the Stokes Law, the average terminal velocity $V_t$ of a bubble can be related to its diameter $d_p$:

$$V_t = g d_p^2 \Delta\rho_l / 18\mu_l \tag{9}$$

where $\Delta\rho_l$=difference between air and liquid densities, and $\mu_l$=viscosity of liquid.

Substituting Equations (8) and (9) in Equation (3) and integrating the following relationship for the residence time $T_b(=t)$ of a rising bubble, obtains:

$$T_b = \int_o^{z=Z} \frac{18\mu_l dz}{g\Delta\rho d_{p_o}^2 \left[\frac{P_a + (g/g_c)\rho_l Z}{P_a + (g/g_c)\rho_l(Z-z)}\right]^{2/3}} = t \tag{10}$$

For maximum floatation efficiency, the residence time $T_l$ of the liquid is set to equal the average residence time $T_b$ of the rising air bubbles. That is:

$$T_b = T_l = \text{volume of channel/volume of flow rate} \tag{11}$$

Since the weight of particles attaching to individual air bubbles is very small compared to the buoyancy force of the individual bubbles, the specific gravity and the volume of the air bubbles will remain substantially constant during floatation. This is an assumption which is valid for normal DAF operation where the quantity of air supplied for the solid and liquid loadings specified is sufficient and the coalescence of air bubbles due to turbulence is negligible.

By equating the residence time $T_b$ of the rising air bubbles to the residence time $T_l$ of the liquid flowing through the channel, either the length or the height inside the channel can be determined from the other. The residence times $T_l$ and $T_b$ are typically set between 5 min. and 15 min., depending on the characteristics of the liquid to be treated and on the ratio of the air supplied to the hydraulic loading.

Although a mixture of the untreated liquid and air dissolved in liquid can be introduced from either end of the channel, from a viewpoint of the conservation of angular momentum and ease of removal of settled solids from the tank bottom, involutional flow is preferred over evolutional flow. To maintain plug-flow conditions for high separation efficiencies, throughput capacity may also be increased by using several involutional or evolutional flow channels in a single tank.

The maximum liquid flow rate for a given DAF tank with a fixed channel height can be determined by equating the liquid residence time $T_l$ to the air bubbles residence time $T_b$ for a predetermined channel height. Assuming plug-flow for a specific liquid and flow rate, the tank diameter, number of flow channels, the liquid height in the tank, and channel dimensions (length, width and height) can hydrodynamically determined. The liquid height in the tank (typically 1.2 to 2.0 meters) is usually maintained about several inches above the top of the partition walls of the flow channels in order to facilitate the removal of floated sludge.

A suitable device for releasing and mixing the air dissolved in liquid under pressure with the liquid to be treated is provided. For a large tank or a long flow channel, several air release and mixing devices are contemplated.

Referring now to the accompanying drawings wherein like reference characters and numerals designate like or corresponding parts throughout the several views, there is shown in FIG. 1 a DAF system with a flotation tank 10 for implementing the principles of the invention. As shown in FIGS. 2 and 3, tank 10 comprises an upright exterior cylindrical wall 12 radially partitioned by a involute wall 14 about the vertical cylindrical axis of wall 12 to form an involutional flow channel 16. An outer end 14a is secured to wall 12 and an inner end 14b terminates near the cylindrical axis.

Both the untreated liquid $L_u$ and the liquid containing dissolved air $L_a$ are mixed by a mixer 18 and the combined liquids flow continuously through channel 16 and discharge, less any floated matter, through an outlet 24 into a sediment trap 26 located in the bottom center of tank 10. The combined liquids, less settlings collected in trap 26 and any floated matter, pass through a strainer 28 which removes any residual particulate. But for a small portion, treated liquid $L_t$ from strainer 28 passes to a reservoir 30 which determines the liquid level LL in tank 10 by the elevation of an overflow outlet 32. This method of controlling the liquid level sometimes produces sludges of low solid contents. Consequently, it may be desirable to control the level by a liquid height sensor (not shown) which produces a signal indicative of the height to a regulator responsive to the signal to control a liquid pump for controlling the liquid inflow rate.

A small amount of the treated liquid $L_t$ saturated with dissolved air under pressure is recycled as liquid $L_a$ to inlet 20 of tank 10. Compressed air from a supply 44 is introduced into liquid $L_t$ at the input of a pump 46, and any undissolved air in liquid $L_a$ at its output is accumulated in a dissolution and separator tank 48 and ventilated by a relief device 47. Of course, other means for introducing dissolved air into the untreated liquid $L_u$ are contemplated. For example, an aspirator or ejector, using a part of the treated liquid as a motive fluid, may be used for mixing the air into the liquid.

Suspended matter or scum floated to the liquid surface in tank 10 by contacting microbubbles are removed through a tangential overflow trough 34 at the top of exterior wall 12. A skimmer 36 with curved blades, rotatably mounted above the liquid surface on a support 38 and continuously driven by a slow-speed motor 40, discharges the floated matter or scum through trough 34 for appropriate disposal. If desirable, the floated matter may be removed from the liquid surface directly using a suction head.

The arrows shown in FIGS. 2 and 3 illustrate the upward involutional path of the microbubbles of air and floated suspended matter as the liquid flows through channel 16. Released air bubbles attach to floatable particles of suspended matter and cause them to rise and float to the surface. Heavier solids, under centrifugal and gravitational forces, continue to flow with the liquids and gradually settle toward the bottom of tank 10. A concentration gradient, maximum at the top for the floatable matter and maximum at the bottom for settlings, is thereby established. Heavier solids or settlings collected in trap 26 are removed through gate valve 42, and floated matter is pushed out by skimmer 36 into overflow trough 34. Any small non-floatable suspended matter remaining in the liquids, is discharged from tank 10 through central outlet 24 and removed at strainer 28. Due to the involutional flow of the liquid, floated suspended matter may sometime tend to accumulate near the center of tank 10. In that event, the suspended matter may be easily removed by suction means, not shown, instead by skimmer 36.

Referring now to the DAF system of FIG. 4, an upright cylindrical tank 50 is provided for evolutional flow. This embodiment is especially suitable for separating suspended matter in liquids which do not contain settling solids. An involute interior wall 52 forms an evolutional flow channel 54 with an inlet 56 at the bottom center of the tank and a peripheral outlet 58 in the side of the tank near the bottom for imparting evolutional flow through channel 54. Untreated liquid $L_u$ is mixed with a liquid $L_a$ saturated with dissolved air under pressure in a static mixer 60 and introduced into tank 50 through a diffuser 62. The liquid mixture flows evolutionally, as shown by the arrows in FIG. 5, through channel 54, outlet 58, trap 26 and strainer 28 to overflow reservoir 30 where overflow outlet 32 maintains the liquid height LL in the tank 50 in the same manner described for the system of FIG. 1. Solids collected in the bottom of tank 50 are removed at peripheral outlet 59.

The liquid $L_a$ is saturated with dissolved air under pressure in the same manner. Compressed air from supply 44 is dissolved in a small amount of the treated liquid $L_t$ from strainer 28, and conducted through pump 46 and tank 48 equipped with a relief value 47 to mixer 60. Other methods and devices for dissolving air into a liquid under pressure, are a high-speed mixing pump, a tank with or without packings, and a static mixer.

In order to supply sufficient air bubbles uniformly dispersed in liquid being treated in a large tank having long involute channels, a number of release devices are provided near the liquid entrance or along the length of channel for distributing the bubbles. FIGS. 7–11 show an upright cylindrical floatation tank 90 having an exterior wall 92 internally partitioned by an involute partitioning wall 94 to form an involute flow channel 96 for liquid $L_u$ introduced through a peripheral inlet 98 in the side of tank 90 near the bottom to a bottom central outlet 100 in the manner described for tank 10 of FIG. 1. Liquid $L_a$ containing dissolved air is mixed with the untreated liquid $L_u$ at the bottom of tank 90 by diffusers 102 which are fluidly connected at spaced intervals to a spiral header 104, and by a static mixer 106 and a diffuser 108 at inlet 98. Diffusers 102 preferably have nozzles 103 directing liquid $L_a$ downstream to provide additional thrust to the liquid for enhancing involutional flow. Obviously the nozzles would be discharged in the other direction for evolutional flow. This design configuration thereby provides a continuous introduction of air bubbles along the entire flow path of the liquid and increases tank capacity for floatation. Settled and floated matter are removed in the same manner as described for tank 10.

Figure 12:
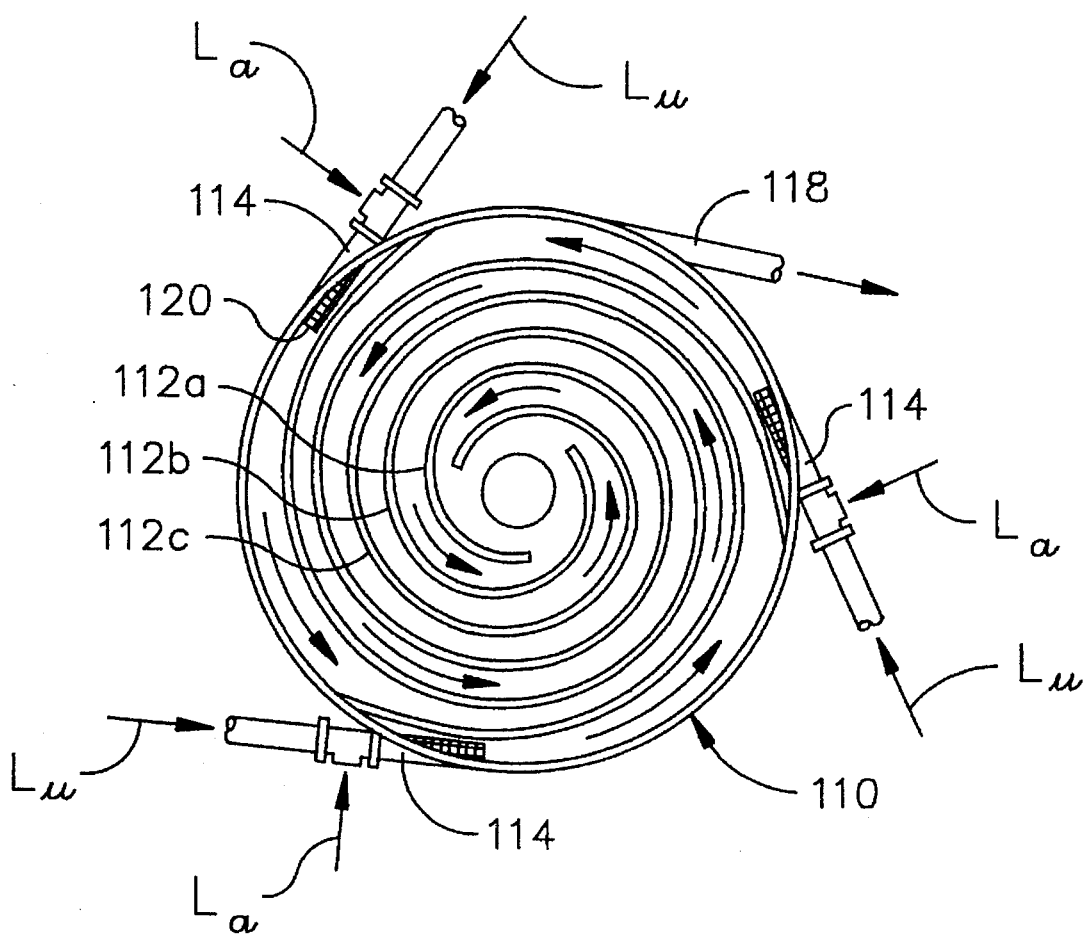
FIG. 12 is a cross sectional plan view of a multichannel involutional flow tank according to the invention for use in a DAF system.

It is further contemplated that the DAF tank may be provided with more than one flow channel. FIG. 12, for instance, shows a floatation tank 110 with three flow channels. The tank is partitioned by three involute walls 112a, 112b and 112c at 120° angular spacing to define three involutional flow channels each having a separate peripheral liquid inlet 114, but a common central liquid outlet 116 at the bottom center of the tank and a single overflow outlet 118 for floated matter. Each liquid inlet 114 is provided with a static mixer 120 for combining liquid $L_a$ saturated with dissolved air and untreated liquid $L_u$. Of course, this configuration is also suitable for evolutional flow, as well, and the number of involute walls can be varied according to specific requirements.

It should be apparent from the foregoing discussion that there are several important considerations for successful practice of the invention. The dimensions (length, height and width) of the flow channel in the DAF tank, for a given hydraulic loading, should provide a residence time of the liquid in the channel equal to or slightly larger than that of the air bubbles in the liquid. This allows the air bubbles and floated matter sufficient time to rise to the surface before the liquid has reached the channel outlet. The average linear velocity of the liquid in the channel must be kept slightly below the value determined from the required residence time. Providing either a longer flow channel or a slower flow rate, enables the liquid residence time to be easily varied. The quantity of air supplied should be sufficient for the solid loading and the liquid loading specified. The volume concentration of air bubbles in the liquid to be treated is a very important factor for good floatation. In general, the greater the air bubble volume concentration, the faster the rate of removal of suspended matter. For this reason, the air required should be determined by the hydraulic loading, i.e. liquid flow rate, preferably at least 8 to 10 g. air/cu.m. water. The average size of air bubbles released should be controlled within a range of about 10 to 40 microns by controlling the pressure differential and flow rate across the release device. The sizes of air bubbles are preferably limited to approximately 130 microns by limiting the channel height and the liquid height. The solubility of saturated air in the liquid is a function of the air pressure and the liquid temperature. The actual concentration of dissolved air in a liquid without saturation depends also on the contacting time and the mixing effect between the two fluids. Therefore, the air dissolution is also important.

In order to protect the floated sludge layer on the surface of liquid from wind and rain, a DAF tank may be placed under a protective cover. If recovery of used air or treated gas is desired, the top of the tank may be sealed with a gas outlet to a separate container.

The absence of liquid turbulence and back-mixing in the DAF tank provided by the invention enables most industrial applications to achieve very high separation efficiencies without coagulants or flocculants. This includes spearations of very stable and dilute emulsions, and separations of liquids at very high liquid rates. Chemical contamination of treated liquids may be prevented and thereby eliminate a need for secondary treatments of many industrial liquid wastes.

The DAF tank provided by the invention is simple in design and operation. It can separate hard-to-separate emulsions with the use of little or no chemicals, and treat liquids at high rates and high separation efficiencies. Many conventional DAF tanks can be readily modified or retrofitted according to the invention by replacing existing internal structure with the involute partitions and relocating liquid inlets and outlets.

Other applications of the invention than those described above are possible. For example, with little or no modification, it can be used for treating liquids containing organic matter, both suspended and dissolved, by using an oxidizing gas such as oxygen, ozone and chlorine, alone or mixed with air, to remove the suspended matter and at the same time to digest the dissolved organic matter. When applied to an activated sludge process for converting dissolved organic matters in a wastewater using microorganisms, a part of the floated or settled sludge, containing mainly the microorganisms, may be recycled and added to the raw wastewater, and a part of the treated wastewater recycled for dissolving air or oxygen, needed for the microorganisms and then mixed into the raw wastewater in the DAF tank. For producing drinking water, the raw water may be treated with a biocide, such as chlorine, chlorine dioxide, a chlorine donor, or a non-oxidizing biocide, alone or mixed with air. Gases and gas wastes may also be separated or treated according to the invention by physical or chemical absorption using a suitable liquid. On the other hand, gases dissolved in a liquid can be stripped by desorption with dissolved air bubbles. An example is the stripping of ammonia dissolved in water by dissolved air. It is thus apparent the invention can be used for treating both liquids and gases, and for reacting a gas with a liquid. Since the invention can simultaneously remove both floatable and settable suspended matter, it can be used for gravity separation of liquids containing many forms of suspended matter. It can also promote hydraulic flocculation of suspended matter contained in the liquid being treated and therefore may serve as a flocculator with or without separating the flocs formed.

It will be understood that various changes in the details and arrangement so parts, which have been herein described and illustrated in order to explain the principles of the invention, can be made by those skilled in the art within the principle and scope of the invention as defined in the appended claims.

We claim:

1. In an upright tank having at least one partition therein defining an involute flow channel extending from near the bottom of the tank to an elevation below the top of the tank with a free-standing inner end terminating near the center of the tank, and inlet and outlet ports communicating at either end of the flow channel near the bottom thereof, a method of clarification by separating suspended matter from unclarified liquid with dissolved gas floatation, comprising the steps of:

mixing the unclarified liquid with a clarified liquid containing a dissolved gas to form a mixture;

introducing said mixture through the inlet port into the involute flow channel;

separating said suspended matter from said mixture by microbubbles of the gas released from the mixture producing thereby said clarified liquid;

simultaneously discharging said clarified liquid at the outlet port and removing said separated matter from the surface of said mixture;

dissolving the gas in a discharged portion of said clarified liquid for mixing with the unclarified liquid; and maintaining a flow rate of said mixture through the tank at a level near the top of the partition with a residence time $T_l$ of the mixture in the flow channel at least equal to a residence time $T_b$ of the microbubbles in the mixture.

2. A method according to claim 1 further comprising the step of:

adding to said unclarified liquid a chemical suitable for separation of said unclarified liquid prior to mixing the unclarified liquid with said clarified liquid containing said dissolved gas.

3. A method according to claim 1 further comprising the step of:

settling and removing the settlable component of said suspended matter through an outlet of the flow channel.

4. A method according to claim 1 wherein:

said gas contains an oxidizer.

5. A method according to claim 1 wherein:

said gas contains a biocide.

6. A method according to claim 1 wherein:

at least a part of said gas is capable of being absorbed by the liquid.

7. A method according to claim 1 wherein:

the unclarified liquid contains a contaminant dissolved gas, and the gas dissolved in said clarified liquid is capable of stripping at least a part of said contaminant dissolved gas from said unclarified liquid.

8. A method according to claim 1 wherein:

said gas is chemically reactive with said liquid.

9. A method according to claim 3 further comprising the step of:

recycling and adding a said portion of said settlable component of suspended matter to said unclarified liquid.

10. A method according to claim 1 further comprising the step of:

settling and removing a settleable component of said suspended matter from a central outlet at the bottom of the tank.

11. A method according to claim 1 further comprising the step of:

recycling and adding a portion of said separated suspended matter to said unclarified liquid.

12. A method according to claim 1 wherein the residence time $T_b$ of said microbubble is $$T_b = \int_o^{z=Z} \frac{18 \mu_l dz}{g \Delta \rho d_{po}^2 \left[ \frac{P_a + (g/g_c) \rho_l Z}{P_a + (g/g_c) \rho_l (Z-z)} \right]}$$

where:

z=a given depth of said mixture,
Z=total depth of said mixtures,
$\mu_l$=viscosity of said mixture,
$\Delta \rho$=difference in densities of said mixture and said air,
$d_{po}$=initial diameter of bubbles,
$P_a$=atmospheric pressure; and
$\rho_l$=density of said mixture.

13. A process of clarification by separating matter suspended in untreated liquid, comprising, in combination, the steps of:

providing an upright tank with at least one partition defining an involute flow channel in said tank, the channel extending from near the bottom of the tank to a level below the top of the tank with a free-standing inner end terminating near the center of said tank, and inlet and outlet ports communicating at either end of the channel near the bottom of the tank;

dissolving a gas in a portion of a treated liquid discharged from the outlet port to form a first mixture;

blending the first mixture with the untreated liquid to form a second mixture;

introducing the second mixture to the channel through the inlet port;

removing the suspended matter floated to the surface by microbubbles released from the second mixture as the second mixture flows through the channel;

discharging the treated liquid through the outlet port; and maintaining the flow rate of said second mixture in the tank at a level near the top of the partition with a residence time $T_l$ in the flow channel of said second mixture at least equal to the residence time $T_b$ of the microbubbles in said second mixture.

14. A process according to claim 13 wherein the gas is an oxidizer for digesting organic constituents in the matter.

15. A process according to claim 14 wherein said gas is selected from the group consisting essentially of oxygen, ozone, chlorine.

16. A process according to claim 15 further comprising:

mixing the oxidizer with air.

17. A process according to claim 13 further comprising:

adding a portion of the removed matter to the untreated liquid for converting dissolved organic matter in the untreated liquid.

18. A process according to claim 13 further comprising:

adding a biocide to the untreated liquid for producing potable water.

19. A process according to claim 18 wherein the biocide is selected from the group consisting essentially of chlorine, chlorine oxide, a chlorine donor and a non-oxidizing biocide.

20. A process according to claim 19 further comprising mixing the biocide with air.

21. A process according to claim 13 wherein the gas is capable of chemically reacting with the liquid.

22. A process according to claim 13 wherein the residence time $T_b$ of said microbubble is $$T_b = \int_o^{z=Z} \frac{18 \mu_l dz}{g \Delta \rho d_{po}^2 \left[ \frac{P_a + (g/g_c) \rho_l Z}{P_a + (g/g_c) \rho_l (Z-z)} \right]}$$

where:

z=a given depth of said mixture,
Z=total depth of said mixtures,
$\mu_l$=viscosity of said mixture,
$\Delta \rho$=difference in densities of said mixture and said air,
$d_{po}$=initial diameter of bubbles,
$P_a$=atmospheric pressure; and
$\rho_l$=density of said mixture.

* * * * *